(12) United States Patent
Haaf et al.

(10) Patent No.: US 8,286,247 B2
(45) Date of Patent: Oct. 9, 2012

(54) METHOD AND SYSTEM FOR CARRYING OUT MAINTENANCE OR SERVICE OPERATIONS ON MACHINES

(75) Inventors: Franz Haaf, Sinsheim-Weiler (DE); Tom Oelsner, Frankfurt am Main (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 941 days.

(21) Appl. No.: 11/702,989

(22) Filed: Feb. 6, 2007

(65) Prior Publication Data

US 2007/0266424 A1    Nov. 15, 2007

(30) Foreign Application Priority Data

May 12, 2006 (DE) .......................... 10 2006 022 710

(51) Int. Cl.
- *H04L 29/06* (2006.01)
- *G06F 11/00* (2006.01)
- *G06F 12/14* (2006.01)
- *G06F 12/16* (2006.01)
- *G08B 23/00* (2006.01)
- *G06F 11/30* (2006.01)

(52) U.S. Cl. ............ 726/25; 726/24; 713/189; 713/193; 709/206; 709/223

(58) Field of Classification Search .................. 726/254, 726/24, 25; 709/206, 223; 713/189, 93, 713/931
See application file for complete search history.

(56) References Cited

U.S. PATENT DOCUMENTS

| | | | |
|---|---|---|---|
| 5,303,005 A | 4/1994 | Takano et al. | |
| 5,335,048 A | 8/1994 | Takano et al. | |
| 5,680,541 A | 10/1997 | Kurosu et al. | |
| 6,006,045 A | 12/1999 | Miyawaki | |
| 6,775,238 B1 | 8/2004 | Suzuki | |
| 7,487,233 B2 * | 2/2009 | Iwamoto et al. | 709/223 |
| 7,565,554 B2 * | 7/2009 | Joosten et al. | 713/193 |
| 2001/0003827 A1 * | 6/2001 | Shimamura | 709/206 |
| 2002/0057456 A1 | 5/2002 | Dauer et al. | |

(Continued)

FOREIGN PATENT DOCUMENTS

| | | |
|---|---|---|
| DE | 101 54 349 A1 | 5/2002 |
| EP | 1 206 088 A2 | 5/2002 |
| JP | 2000196769 A | 7/2000 |
| JP | 2002248286 A | 9/2002 |
| JP | 2003288233 A | 10/2003 |

(Continued)

OTHER PUBLICATIONS

European Search Report dated Dec. 5, 2007.

*Primary Examiner* — Shin-Hon Chen
(74) *Attorney, Agent, or Firm* — Laurence A. Greenberg; Werner H. Stemer; Ralph E. Locher (57) ABSTRACT

A method for carrying out maintenance or service operations on machines, includes transmitting data for a maintenance or service requirement by the computer of the machine over a publicly accessible communications network to a management computer. The management computer checks the status of the machine through the computer of the machine for permissible authorizations. The corresponding service or maintenance operations are carried out on the basis of the authorization of the machine detected by the management computer. The service or maintenance requirement can also be reported by the computer of the machine over the publicly accessible communications network to the management computer, and the management computer can create a checklist for processing the required service and maintenance measures, on the basis of at least one error message received, and can transmit it to the computer of the machine. A system is also provided for carrying out the method.

6 Claims, 4 Drawing Sheets

U.S. PATENT DOCUMENTS

| | | | |
|---|---|---|---|
| 2002/0073356 A1* | 6/2002 | Katayama et al. | 714/4 |
| 2003/0105849 A1* | 6/2003 | Iwamoto et al. | 709/223 |
| 2004/0184589 A1* | 9/2004 | Tamada et al. | 379/121.06 |
| 2006/0294022 A1* | 12/2006 | Dayan et al. | 705/65 |

FOREIGN PATENT DOCUMENTS

| | | |
|---|---|---|
| JP | 2005301413 A | 10/2005 |
| JP | 2005305887 A | 11/2005 |
| JP | 2006085538 A | 3/2006 |

\* cited by examiner

METHOD AND SYSTEM FOR CARRYING OUT MAINTENANCE OR SERVICE OPERATIONS ON MACHINES

CROSS-REFERENCE TO RELATED APPLICATION

This application claims the priority, under 35 U.S.C. §119, of German Patent Application DE 10 2006 022 710.7, filed May 12, 2006; the prior application is herewith incorporated by reference in its entirety.

BACKGROUND OF THE INVENTION

FIELD OF THE INVENTION

The present invention relates to a method and a system for carrying out maintenance or service operations on machines which have at least one computer, wherein the computer of the machines communicates with a management computer over a publicly accessible network.

Machines require continuous maintenance and monitoring in order to retain their full functionality and operational reliability. In the case of machine tools, production machines and even printing machines, maintenance contracts are signed in most cases to ensure that in the event of machine failure or faults, a suitably qualified service technician from the manufacturer or a service provider is available. That is important because those expensive machines are operated around the clock to ensure that there is a return on their high investment costs. Even without such a maintenance contract, the machine operator requires the support of technicians of the manufacturer or an external service provider if serious faults occur or repairs are needed. However, the employment of service personnel in situ incurs high costs both for the service provider or manufacturer and for the customer. Attempts have therefore previously been made to carry out service and maintenance services through a remote maintenance system, as far as is possible. German Published, Non-Prosecuted Patent Application DE 101 54 349 A1, corresponding to U.S. Patent Application Publication No. US 2002/0057456 A1, discloses a method for transmitting data on a printing machine and a diagnostic device for a printing machine. That involves comparing the current operating data on a printing machine with threshold values stored in a computer of the printing machine and, if the stored threshold values are exceeded, undershot or reached, automatically transmitting the data affected thereby to a remote computing unit, e.g. on the premises of the manufacturer of the printing machine. In that case, the computer of the printing machine can also detect the failure of individual components and transmit the data on the failed component to the computer on the premises of the manufacturer or the service provider. If the machine logic is capable of predicting failures, the communication thereof can already be made before a specific failure occurs. The use of such a maintenance system above all enables the manufacturer or service provider to be automatically notified independently of the influence of the machine operator. For that purpose, it is necessary for the responsibility for service to lie fully with the service provider or machine manufacturer through the provisions of the contract. In practice, however, that is mostly not the case because the machine operator, or service personnel at the machine operator, in most cases remove a fault that has occurred in consultation with the machine manufacturer based on the principle of the division of labor. However, no procedures have been established for the performance of actions by the service provider or manufacturer on the computer of the printing machine. Apart from the requirement regarding service personnel and spare parts, German Published, Non-Prosecuted Patent Application DE 101 54 349 A1, corresponding to U.S. Patent Application Publication No. US 2002/0057456 A1, does not indicate how the operator of the machine may be further supported in terms of service measures.

SUMMARY OF THE INVENTION

It is accordingly an object of the invention to provide a method and a system for carrying out maintenance or service operations on machines, which overcome the hereinafore-mentioned mentioned disadvantages of the heretofore-known methods and systems of this general type, which can be remotely maintained by a computer and which allow fully automatic support and monitoring of maintenance or service operations on the computer of the machine by the manufacturer or service provider.

With the foregoing and other objects in view there is provided, in accordance with the invention, a method for carrying out maintenance or service operations on a machine. The method comprises transmitting data for a maintenance or service requirement from a computer of the machine, over a publicly accessible communications network, to a management computer. The status of the machine is checked for permissible authorization through the computer of the machine, with the management computer. Corresponding service or maintenance operations are carried out on a basis of the authorization of the machine detected by the management computer.

Fully automatic processing of service and maintenance inquires regarding a machine may be carried out by a remote maintenance computer through the use of the present invention. The machine may, for example, be a printing machine in a print shop which is connected, through a publicly accessible communications network such as the Internet, to a management computer on the premises of the manufacturer or a service provider engaged by the latter. Management computers and machine computers are protected from the Internet by security measures such as firewalls. In addition, the data transmission between the machine computer and management computer is encrypted to prevent access to them by unauthorized persons. Now, if the machine computer of the printing machine reports a corresponding maintenance and service requirement based on recorded errors or fault messages, the corresponding data are transmitted to the management computer over the Internet. This management computer receives all of the service inquires from all of the machines looked after by the manufacturer or service provider. In order to prevent unauthorized persons from using the service, the authorization status of the associated machine on the premises of the customer is checked after the fault data are transmitted to the management computer. For this purpose, a code, which enables the inquiring machine to be clearly identified, is incorporated in the transmitted data. A comparison can then be made, through the use of this code, with authorization data stored on the management computer or a connected computer. If there is suitable authorization for the inquiring machine, the maintenance and service inquiry is accepted and processed by the management computer. Only the service or maintenance operations corresponding to that authorization are initiated, according to the recognized authorization. In addition to the automatic service or maintenance inquiry initiated on the computer of the machine, an inquiry can also be made manually by the operating personnel themselves on the screen, constructed as a touch screen, or through the use of a keyboard or other input device on the computer of the machine. After the service inquiry is initiated, the authorization check already described is then also carried out. This enables maintenance and service inquiries to be processed automatically.

In accordance with another mode of the invention, a clear identification of the machine also affords the major advantage that the manufacturer or service provider is informed not only of the machine type but also all of the other features of the machine, so that the appropriate fault determination and inspection programs can be automatically selected by the management computer.

In accordance with a further mode of the invention, control elements are activated or blocked on a display device by the management computer on the computer of the machine, depending on the recognized authorization. The control surface on the screen is then adapted to the relevant functions, which can be activated on the basis of the authorization for the machine concerned as determined by the management computer, particularly in embodiments with a touchscreen. Functions for which there is no authorization are either blocked or not displayed on the screen at all. Therefore, it is not possible for the personnel operating the machine to initiate unauthorized functions on the machine. On one hand, this improves operational reliability and on the other, ensures that only the maintenance and service functions can be used for which the operator of the machine has obtained a suitable authorization license. For example, the authorization license may depend on the scope of the maintenance contract which the customer has signed with the manufacturer or service provider.

In accordance with an added mode of the invention, a maintenance or service operation is initiated when an error message is transmitted to the management computer and the management computer assigns to this maintenance and service operation a clear identification which is indicated on the display device of the computer of the machine. As soon as a service or maintenance inquiry has been transmitted to the management computer, the corresponding machine is identified to the customer. An order confirmation, which advantageously contains an order number, is then displayed on the screen of the associated machine computer. This signals to the operator of the machine that his or her maintenance and service inquiry has been received by the manufacturer and is being processed as an order. In addition, a corresponding order number can then be assigned to each service and maintenance inquiry of the customer, so that in the case of several parallel inquiries, the customer always has an idea of which maintenance and service operations belong to which inquiry. Moreover, it is easier for the machine operator to send queries to the manufacturer or service provider, if necessary, by quoting the assigned order number, if he or she requires further support.

With the objects of the invention in view, in an alternative embodiment of the invention, which can be combined with the previous embodiments of the invention, there is also provided a method for carrying out maintenance or service operations on a machine. The method comprises reporting a service or maintenance requirement from a computer of the machine, over a publicly accessible communications network, to a management computer. A checklist for processing required service and maintenance measures is created or issued in the management computer, on a basis of at least one error message received. The checklist is transmitted from the management computer to the computer of the machine.

In this case, a service or maintenance inquiry is also sent by the computer of the machine to the management computer of the manufacturer or service provider over the Internet. The error message received contains, on one hand, clear identification data on the machine concerned and, on the other hand, enables the machine type and series, as well as other machine-specific data, to be determined by the management computer. The management computer also holds, in a central database, a fault table which is stored for all of the machines to be maintained. Depending on the machine detected and the error message received, the management computer can then compile a checklist which contains the service and maintenance measures required for removing the fault. The checklist thus issued is then returned by the management computer over the Internet to the machine computer. The errors and faults reported can then be removed by working through the checklist issued on the computer of the machine. The checklist received may also be stored on the computer of the machine for further maintenance and service operations. Diagnosis and fault processing may therefore also be carried out without the need to prepare an updated checklist and send it to the management computer.

In accordance with another mode of the invention, the checklist includes self-help measures and these self-help measures are indicated on a display device of the computer of the machine. In this case, the measures compiled by the maintenance computer are left to the operating personnel to carry out. The checklist being transmitted is displayed on the screen of the machine computer and can then instruct the operating personnel to remove the errors and faults by taking the appropriate measures. Successful processing of the checklist is documented locally by the computer and is in turn made available to the management computer as information. The method for the central preparation of fault-related checklists has the advantage that they can always be kept up to date centrally and that the information on the processing of checklists can be used for their automatic improvement.

In accordance with a further mode of the invention, the checklist sent to the computer of the machine is processed by that computer automatically. In this case, the operating personnel must not intervene in the removal of the fault or error message because the transmitted checklist is processed automatically by the machine computer. However, the processing of the checklist may also be controlled additionally, or alternatively, by the management computer. Although in this case the individual maintenance steps of the checklist may also be carried out on the machine computer, the initiation of the individual steps on the checklist is controlled by the management computer. If the management computer has calculated a better, more up-to-date checklist while processing it, the management computer may then interrupt the processing of the previous checklist and send the improved checklist to the machine computer and use it there.

In accordance with an added mode of the invention, the processing of the checklist is recorded on the management computer or on the computer of the machine. Under certain circumstances, the processing of the individual steps of the checklist may result in further faults or at least in a change of settings on the machine. In order, if necessary, to be able to provide evidence of correct processing of the transmitted checklist should problems arise, this may be suitably recorded either on the computer of the machine or on the management computer, or even on both computers. Subsequent examination of maintenance measures carried out is therefore possible for both the customer and the manufacturer without difficulty. This is particularly useful in the event of any guarantee claims and liability cases.

In accordance with yet another mode of the invention, the fault table stored on the computer is updated by data transmission from the management computer. In principle, the machine computer is delivered with a pre-installed fault table. For example, the machine computer may decide, on the basis of this table, whether an established fault can be reported to the management computer at all, or whether it is sufficient to display the fault locally only, e.g. on the screen of the machine. However, it may be useful to revise this fault table over the course of time on the basis of knowledge from similar faults and problems that have arisen. This preferably takes place through the use of the management computer on the premises of the manufacturer or service provider on which all of the maintenance and service inquiries made in the past are stored and statistically evaluated. The fault tables for the machine types concerned can be suitably optimized on the basis of these evaluations, then returned to the machine computer through a communications system such as the Internet, where they replace the previously stored fault table. It is therefore possible to profit from past problem solutions in the same or similar machines in future maintenance operations.

In addition to the automatic initiation of service and maintenance inquiries by the management computer, these inquiries can also be made manually by the operating personnel through the use of a keyboard or touchscreen of the machine computer. However, even if the inquiry is made automatically, acknowledgement elements may be present on the computer of the machine, on the actuation of which by the operating personnel depends the execution of the maintenance and service operations transmitted on the basis of the checklist. This also gives the operating personnel control of whether maintenance and service measures proposed to the staff are to be carried out automatically, or whether they should preferably be rejected. This avoids taking the decision out of the hands of the customers and it is still possible to provide the customer with the convenience of a fully automatic service or maintenance measure over the Internet. However, the computer of the machine may also be configured in such a manner that no acknowledgement is required and the maintenance and service operations proceed automatically on the basis of the checklist.

However, as already described, the possibility of selection may be dependent on the maintenance contract signed. The management computer will generally only offer the selection possibilities which are covered by the contract license. Therefore, the customer can also decide independently on the cost of the maintenance measures by only signing a contract for those measures he or she wishes to pay for. The major advantage of this invention resides in the fact that the maintenance and service measures can be processed fully automatically between the machine and the management computer connected over the Internet. No telephone contact is necessary, nor is the insertion of further computers between the customer's machine and the manufacturer's management computer necessary.

With the objects of the invention in view, there is concomitantly provided a system for carrying out the method.

Other features which are considered as characteristic for the invention are set forth in the appended claims.

Although the invention is illustrated and described herein as embodied in a method and a system for carrying out maintenance or service operations on machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read with the accompanying drawings.

DESCRIPTION OF THE PREFERRED EMBODIMENTS

Figure 1:
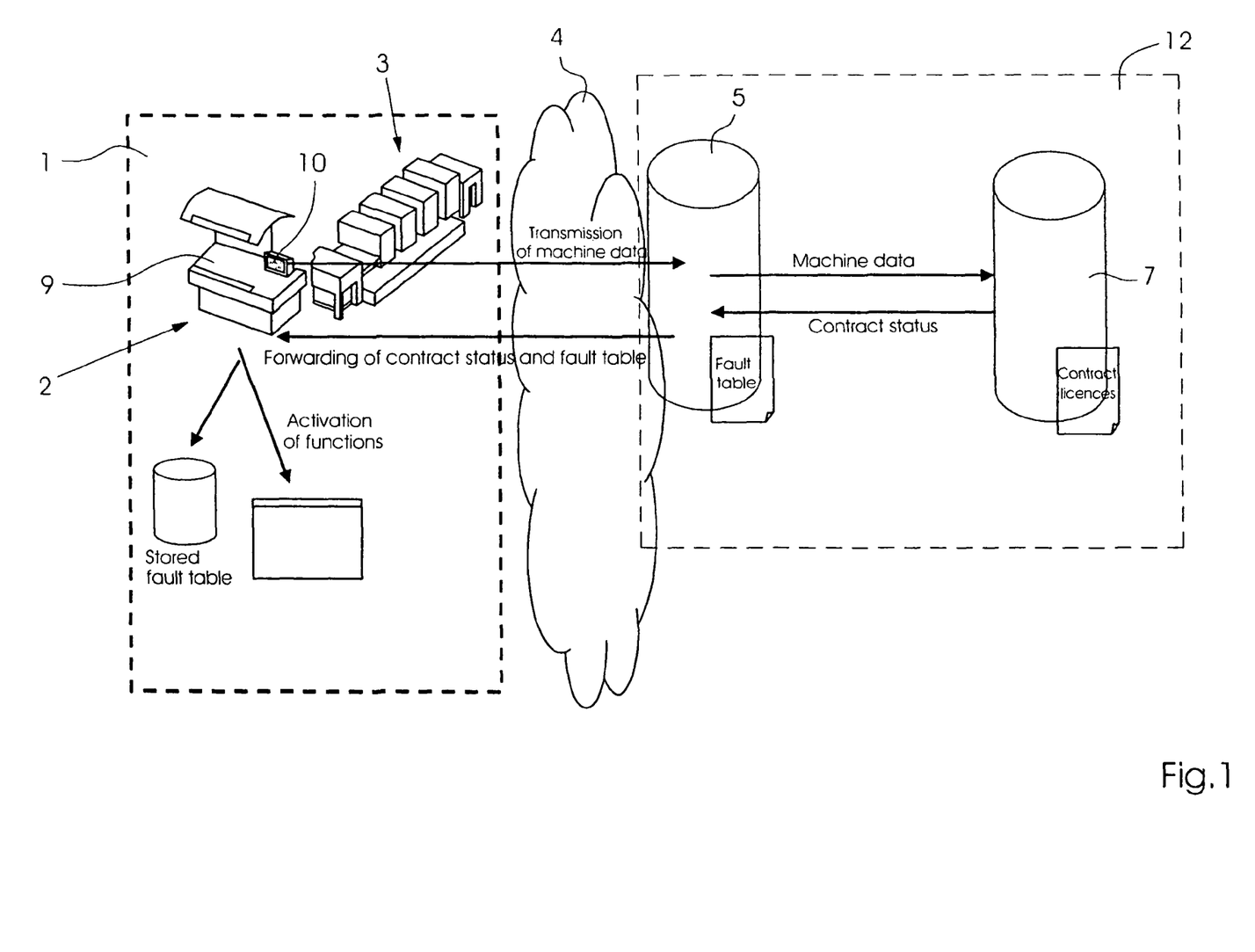
FIG. 1 is a diagrammatic, perspective view of a maintenance and service system according to the invention and a contract management system connected to a management computer.

Referring now to the figures of the drawings in detail and first, particularly, to FIG. 1 thereof, there is seen, diagrammatically, on the left side, a region of a print shop 1 in which one or a plurality of machines 3 are provided for processing printing stock. The print shop 1 in FIG. 1, for example, has a printing machine 3 and a control platform 2, which communicates with the printing machine 3. The control platform 2 incorporates a machine computer 9 and a display device 10 for representing processes and operations. Operating personnel can monitor and operate the printing machine 3 through the use of the control platform 2. The machine computer 9 of the control platform 2, shown in FIG. 1, may be a suitably programmed conventional PC, which communicates with control devices of the printing machine 3. The machine computer 9 in the control platform 2 is connected by a firewall to the Internet 4, and may be connected over the Internet to a central management computer 5 on the premises of a manufacturer 12 of the machine. The central management computer 5 is also connected securely by a firewall to the Internet 4, and is established either on the premises of the manufacturer 12 of the printing machine 3 or on the premises of a corresponding maintenance and service provider. The management computer 5 is therefore spatially separated from the machine computer 9 in the print shop 1.

The embodiment shown in FIG. 1 provides possibilities of selecting maintenance and service operations that depend on contract licenses obtained by the print shop 1. In FIG. 1, a contract management system 7, which enables the management system 5 to check the contract status of the print shop 1 online, is connected to the management computer 5 on the premises of the manufacturer 12 or the service provider. When operation of the machine 3 is started, but no later than when an error or fault message is to be transmitted to the management computer 5, data for identifying the printing machine 3 are forwarded to the contract management system 7, which in turn compares these data with the stored license contracts. If the print shop 1 has only obtained one particular maintenance license, the contract management system 7 establishes this by comparison with the stored contract data and reports this to the management system 5. In this case, the management system 5 will only send a remedy appropriate to the particular contract status to the machine computer 9 of the printing machine 3, so that only the functions and maintenance and service operations appropriate to the particular contract status are activated on printing machine 3. For example, if the contract status only provides for self-help indicating a corresponding fault description, the personnel operating the printing machine 3 cannot call any checklists or automatic check program. If the problem cannot be solved with self-help, however, the operating personnel may be offered the possibility of automatically calling out service personnel of the manufacturer or the service provider through the use of a system on the machine computer 9 of the printing machine 3 and a corresponding key. A fault table being transmitted may also be dependent on the data stored in the contract management system 7. The table contains corresponding escalation stages dependent on the contract data. If no contract licenses have been obtained, the corresponding escalation stages also cannot be transmitted, which means that they cannot be executed on the machine computer 9 of the printing machine 3 either. In this embodiment, the fault table is also stored in the memory of the machine computer 9 of the printing machine 3. The method of the embodiment shown in FIG. 1 may precede methods shown in FIGS. 2 to 4 on one or on a plurality of occasions.

Figure 2:
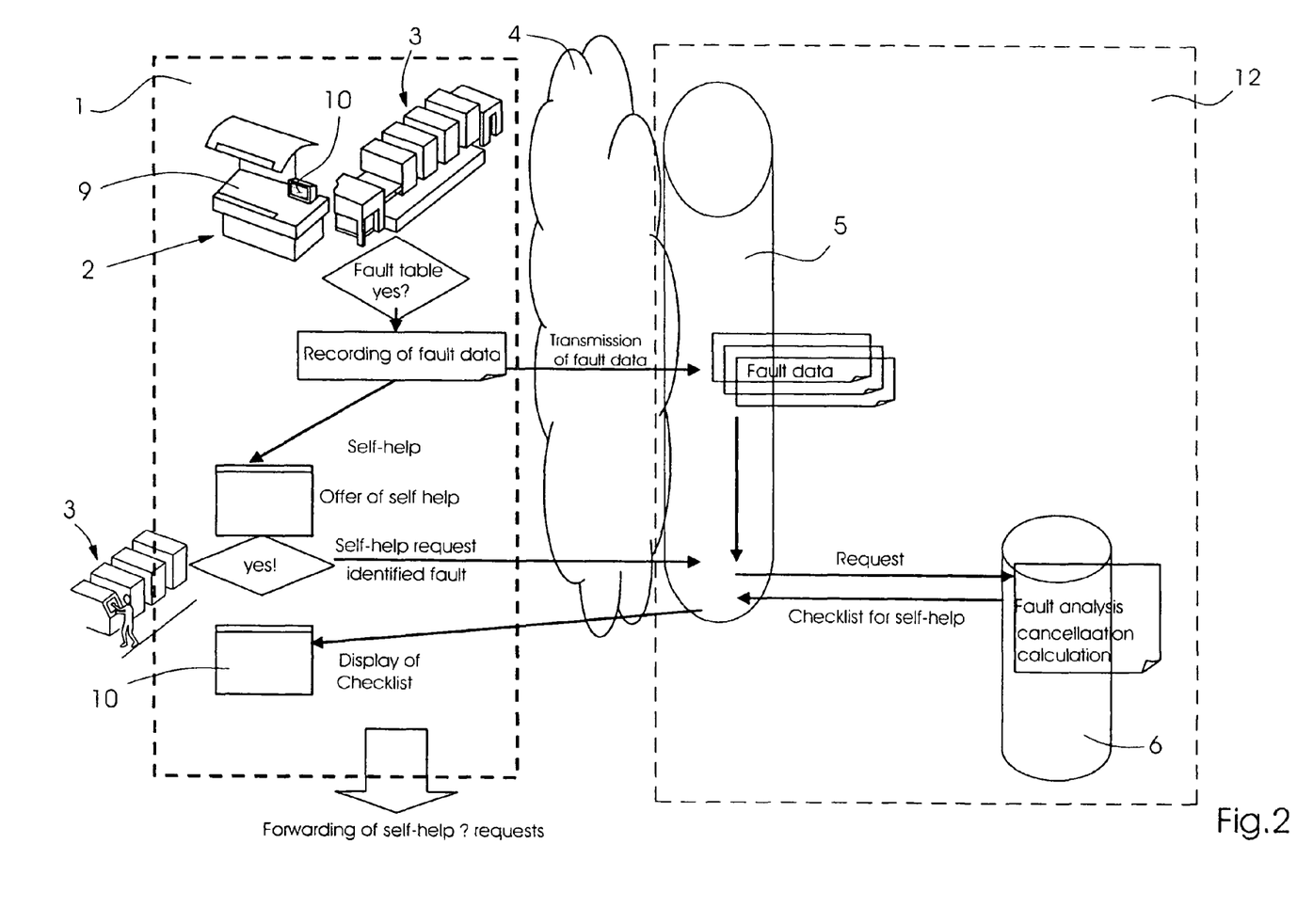
FIG. 2 is a perspective view and flow diagram of a service and maintenance system according to the invention, having a machine computer and a management computer, as well as an analysis system connected to the management computer.

An analysis computer 6 is also connected to the management computer 5 in FIG. 2, and the analysis computer 6 may also be integrated in the management computer 5. The machine computer 9 of the printing machine 3 continuously monitors all of the operating processes and stores any faults and errors according to instructions stored in the machine computer 9. These instructions contain an error or escalation table on the basis of which the machine computer 9 is able to decide a category into which an error or fault message is to be classified. The machine computer 9 constantly compares this fault table with error or fault messages from the printing machine 3. If an error or fault message is classified as correspondingly serious, this error message and any associated further data are transmitted over the Internet 4 to the management computer 5. The machine data on the printing machine 3, together with a clear identification of the machine 3, are transmitted simultaneously with these fault data, so that the management computer 5 knows immediately which machine 3, on the premises of which customer, in which print shop 1, has sent the corresponding error message. If the error message or fault established is not so serious, the data transmission to management computer 5 may be dispensed with. In this case, the error message is only indicated on the display device 10 of the control platform 2, so that if necessary the operating personnel themselves are able to react. However, if it has been decided, on the basis of the stored fault table, to transmit the fault to the management computer 5, it is classified accordingly in the connected analysis system 6, and remedial measures are calculated. The analysis system 6 may access similar events in the past to calculate the remedial measures and classify the fault and error message received. The classification and calculation of the remedial measures are therefore continuously improved. After the remedial measures have been calculated, a corresponding checklist is sent by the management computer 5 over the Internet 4 to the machine computer of the printing machine 3. This checklist is then indicated on the display device 10 of the machine computer 9 in the print shop 1. The checklist can be suitably worked through by the personnel operating the printing machine 3. The processing of individual steps of the displayed checklist must in this case be carried out by the operating personnel through the use of the keyboard of the machine computer 9 or a screen of display device 10 constructed as a touchscreen. If the checklist has been correctly processed, the fault should then have been correspondingly removed.

However, the forwarding of a checklist represents only one or a plurality of possibilities of carrying out service and maintenance operations. Initially, only the fault to be removed can be displayed easily to the operating personnel, which then involves self-help if the operating personnel possess the required knowledge. If the operating personnel make use of the self-help facility, no further measures are initially initiated by the management computer 5. The third alternative is to be found at the exact opposite end of the automation scale, where the checklist transmitted is automatically processed on the machine computer 9 and corresponding faults are removed by the machine computer 9 of the printing machine 3 alone or are corrected in an interaction with further support from the management computer 5. In this case, the operating personnel learn only through the display device 10 of the control platform 2 that a maintenance and service measure is being carried out, but no intervention on the part of the operating personnel is required. Upon request, the operating personnel may choose from among the three remedial measures mentioned, by inputting corresponding operating data on the control platform 2.

Figure 3:
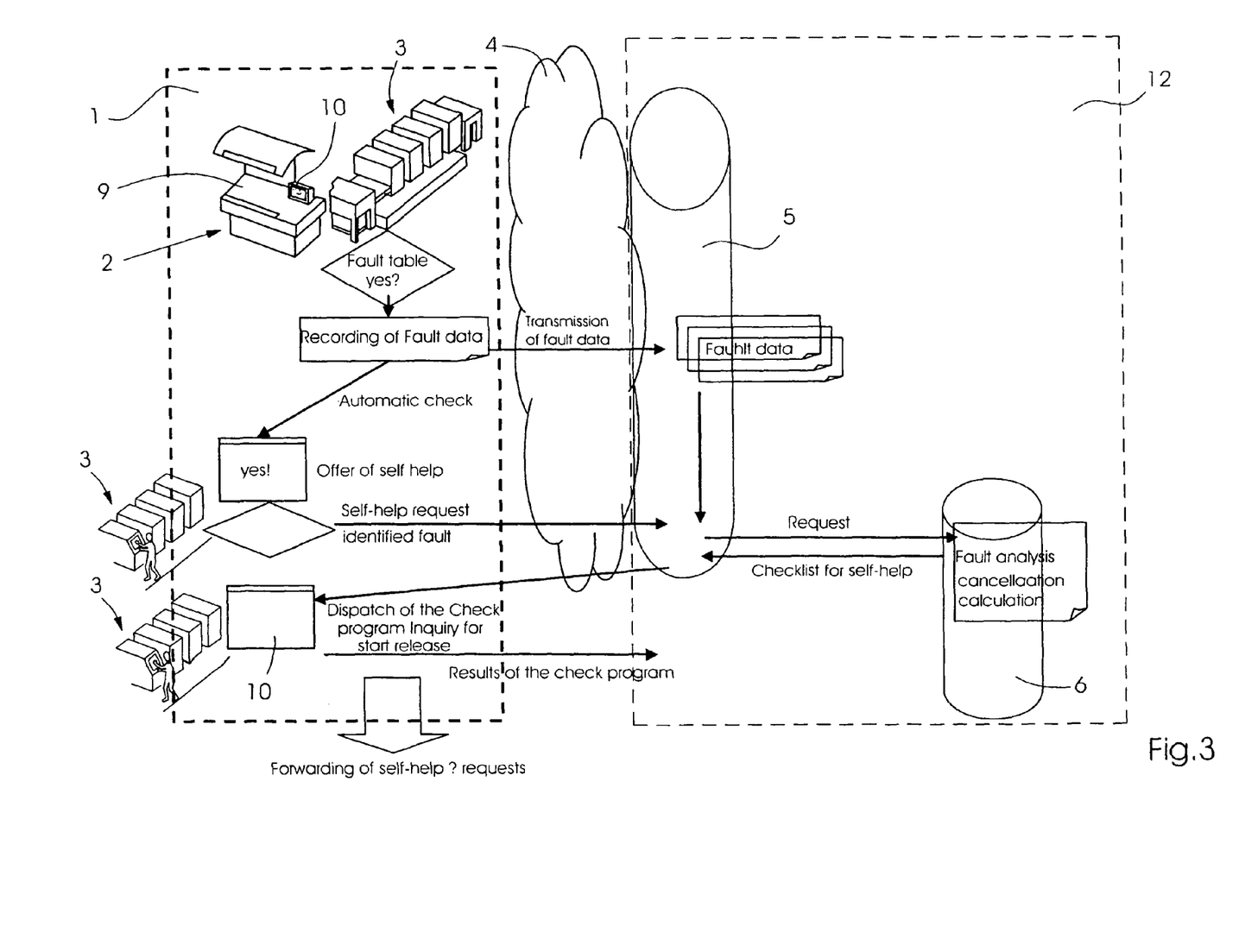
FIG. 3 is a perspective view and flow diagram illustrating a transmission of checklists and auxiliary offers.

FIG. 3 shows, in more detail, the process that takes place when the operating personnel have selected the automatic processing of a checklist. In this case, the operating personnel press a corresponding key on the control platform 2, which initiates the automatic checking process. A suitable checking program, updated through the use of the analysis system 6, as a function of the error message sent to the management computer 5, is requested through this automatic process by the management computer 5, and transmitted over the Internet 4 to the machine computer 9. This checking program is constructed in such a way that it is able to analyze the faults reported in greater detail and can also remove them if possible. For this purpose, the checking program is processed on the machine computer 9 of the printing machine 3. The processing of the checking program on the machine computer 9 supplies corresponding results which are in turn transmitted over the Internet 4 to the management computer 5 and are also accessed by the analysis system 6, so that future similar maintenance and service operations can be improved. If the reported errors and faults could be removed by processing the checking program, this is suitably indicated to the operating personnel on the control platform 2. If further measures are required, this is also suitably indicated on the control platform 2 and corresponding service personnel are automatically requested, by the management computer 5, to eliminate the remaining problems, if this is necessary. The embodiments according to FIGS. 2 and 3 may be provided as alternatives to the embedment shown in FIG. 1, but may also be combined with the system shown in FIG. 1.

Figure 4:
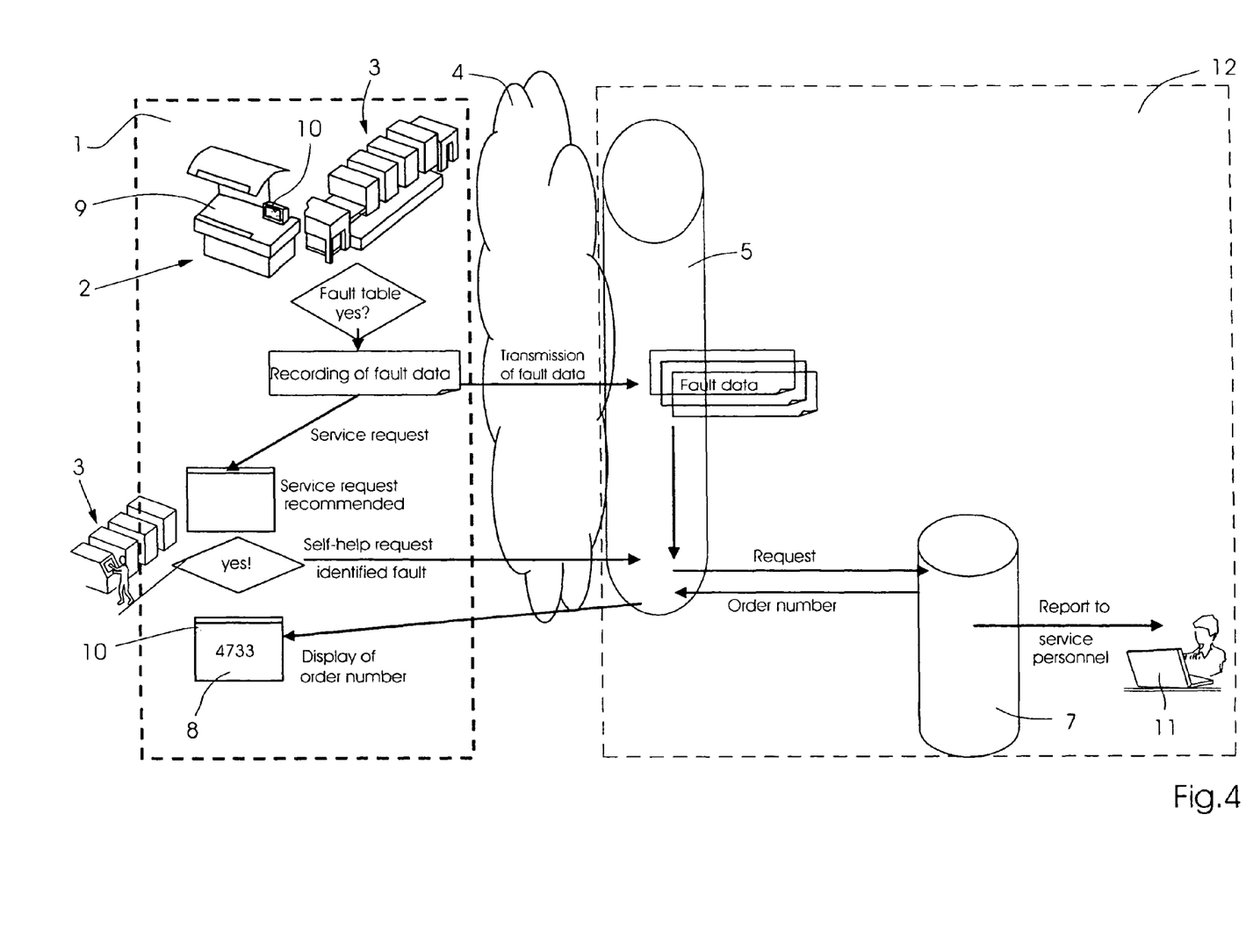
FIG. 4 is a perspective view and flow diagram illustrating a transmission of an order confirmation to the machine computer.

The embodiment shown in FIG. 4 illustrates the required engagement of the manufacturer or service provider for maintenance and service work. In this case, the management computer 5, on the premises of the machine manufacturer 12 or the service provider, has the possibility of accessing data in a contract management system 7. If an error message is transmitted to the machine 3, it is correspondingly classified as having been received, and if there is a need for the management computer 5 to intervene, it is transmitted to it over the Internet 4. In parallel with this, a suitable service operation can be requested manually on the control platform 2 of the printing machine 3 by the operating personnel, through the use of an input key. The service operation so requested is also transmitted to the management computer 5 over the Internet 4, if required. The identity of the printing machine 3 to be maintained is known by the coded transmitted error message in the management computer 5. The error message and identity are then combined to form an order confirmation 8 in the contract management system 7, where the customer data are stored. This is in turn transmitted through the management computer 5 and the Internet 4 back to the machine computer 9 of the printing machine 3, and there displayed on the screen 10. This order confirmation 8 contains an order number to be clearly allocated, so that the personnel operating the printing machine 3 can, in principle, make reference to the current service order in the case of queries or if further problems arise. When the service and maintenance measure to be carried out has been successfully completed, the operating personnel can be notified of the successful completion of the service measure on a display device of the control platform 2, with an indication of the order number 8. In this way, the operating personnel are kept constantly up to date with current service inquiries and maintenance on the machine 3. If service and maintenance inquiries cannot be answered by the management system 5, a suitable service technician may also be called in by the contract management system 7, always assuming that such engagement of a service technician is covered by the corresponding contract license of the owner of the print shop 1. It is only when the reconciliation of the fault data sent, including the identification with the data stored in the contract management system 7 provides such authorization, that a suitable service technician is called in. Otherwise, this function is not available to the inquiring print shop 1.

We claim:

1. A method for carrying out maintenance or service operations on a machine, the method comprising the following steps:
   automatically transmitting data for a maintenance or service inquiry from a computer of the machine, over a publicly accessible communications network, to a management computer;
   checking with the management computer, through the computer of the machine, a status of the machine for permissible service inquiry authorization by comparing a contract status of the machine with stored license contracts; and
   if the machine is authorized for the service inquiry, sending a remedy appropriate to the contract status by the management computer to the computer of the machine so that only maintenance and service operations appropriate to the contract status are activated on the machine.

2. The method according to claim 1, which further comprises transmitting data for clear identification of the machine from the computer of the machine to the management computer.

3. The method according to claim 1, which further comprises activating or blocking control elements on the computer of the machine, with the management computer, on the basis of the detected authorization on a display device.

4. The method according to claim 1, which further comprises initiating a maintenance or service operation when an error message is transmitted to the management computer, assigning a clear identification to the maintenance or service operation with the management computer, and indicating the identification on a display device of the computer of the machine.

5. The method according to claim 1, which further comprises indicating acceptance or rejection of a service or maintenance operation with the management computer on a display device of the computer of the machine.

6. A system for carrying out maintenance or service operations on a machine, the system comprising:
   a management computer remote from the machine;
   a computer of the machine for automatically transmitting data for a maintenance or service inquiry over a publicly accessible communications network to said management computer; and
   said management computer, through said computer of the machine, checking a status of the machine for permissible service inquiry authorization by comparing a contract status of the machine with stored license contracts, and if the machine is authorized for the service inquiry, sending a remedy appropriate to the contract status by the management computer to the computer of the machine so that only maintenance and service operations appropriate to the contract status are activated on the machine.

* * * * *